United States Patent
Cummings et al.

(10) Patent No.: US 8,271,141 B2
(45) Date of Patent: Sep. 18, 2012

(54) CONTROL VALVE SYSTEM WITH CYCLE MONITORING, DIAGNOSTICS AND DEGRADATION PREDICTION

(75) Inventors: Eric O. Cummings, Lexington, SC (US); Richard J. Frazier, Eastanollee, GA (US); Donald S. Divelbiss, Howard, OH (US); Terry L. Divelbiss, Fredericktown, OH (US); David W. Haselden, Jr., Canon, GA (US)

(73) Assignee: Ross Operating Valve Company, Troy, MI (US)

( * ) Notice: Subject to any disclaimer, the term of this patent is extended or adjusted under 35 U.S.C. 154(b) by 1107 days.

(21) Appl. No.: 12/135,666

(22) Filed: Jun. 9, 2008

(65) Prior Publication Data

US 2009/0306830 A1    Dec. 10, 2009

(51) Int. Cl.
*G05D 7/00*    (2006.01)
(52) U.S. Cl. ............... 700/282; 700/28; 702/18; 137/55
(58) Field of Classification Search .................. 700/272, 700/281, 282; 702/33, 114; 137/386; 73/149, 73/168
See application file for complete search history.

(56) References Cited

U.S. PATENT DOCUMENTS

| | | | |
|---|---|---|---|
| 5,251,148 A | 10/1993 | Haines et al. | |
| 5,320,123 A | 6/1994 | Corso et al. | |
| 5,329,465 A * | 7/1994 | Arcella et al. | 702/184 |
| 5,433,245 A * | 7/1995 | Prather et al. | 137/554 |
| 5,826,616 A | 10/1998 | Golden | |
| 6,246,309 B1 | 6/2001 | Heinz et al. | |
| 6,505,642 B2 | 1/2003 | Miyazoe et al. | |
| 6,612,333 B2 | 9/2003 | Miyazoe et al. | |

(Continued)

FOREIGN PATENT DOCUMENTS

| EP | 1365159 | 11/2003 |
|---|---|---|
| WO | W02006056214 | 6/2006 |

OTHER PUBLICATIONS

Bo Ling; Zeifman, M.; Ming Liu; , "A practical system for online diagnosis of control valve faults," Decision and Control, 2007 46th IEEE Conference on , vol., No., pp. 2572-2577, Dec. 12-14, 2007.*
Website Article: Warnett, Chris; Valve Diagnostics in the Digital Age, New Control-Valve Actuators Enhance Productivity & Operating Performance, Oct. 2008, http://flowcontrolnetwork.com/issuearticle.asp?ArticleID=291.
International Search Report and Written Opinion mailed Sep. 30, 2009.

*Primary Examiner* — Dave Robertson
(74) *Attorney, Agent, or Firm* — Carlson, Gaskey & Olds, P.C.

(57) ABSTRACT

A valve body has an elongated bore in communication with an inlet port and an outlet port. A valve element is movable within the bore between deactuated and actuated positions. A valve sensor generates a sensor signal indicative of an instantaneous parameter of the valve that changes between the deactuated and actuated positions. A logic unit receives the sensor signal and a pilot command signal that actuates the valve. A predetermined change in the pilot command signal causes the logic unit to determine a cycle parameter responsive to a time period between two predetermined events. At least the beginning or end of the time period corresponds to a predetermined value of the sensor signal. The individual determinations of the cycle parameter are accumulated to obtain an expected cycle parameter. The logic unit generates an indication signal when the cycle parameter exhibits a predetermined variance from the expected cycle parameter.

50 Claims, 8 Drawing Sheets

U.S. PATENT DOCUMENTS

| | | |
|---|---|---|
| 7,089,086 B2 | 8/2006 | Schoonover |
| 7,272,533 B2 | 9/2007 | Schlosser |
| 7,882,394 B2 * | 2/2011 | Hosek et al. .................. 714/26 |
| 2002/0029809 A1 | 3/2002 | Miyazoe et al. |
| 2002/0092571 A1 | 7/2002 | Misumi |
| 2003/0208305 A1 | 11/2003 | Junk et al. |
| 2004/0244856 A1 | 12/2004 | Schauz et al. |
| 2009/0164050 A1 * | 6/2009 | Ahmad et al. ................ 700/282 |
| 2009/0222220 A1 * | 9/2009 | Wilke ............................ 702/34 |
| 2011/0173496 A1 * | 7/2011 | Hosek et al. .................. 714/26 |

* cited by examiner

CONTROL VALVE SYSTEM WITH CYCLE MONITORING, DIAGNOSTICS AND DEGRADATION PREDICTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to fluid control valves, and, more specifically, to performance monitoring of fluid control valves.

Fluid control valves, such as pneumatic valves, perform many industrial functions that involve moving fluid energy from an inlet to one or more outlets and from the one or more outlets to one or more exhaust ports. The fluid energy may be used to control motion of pneumatic cylinders, for example. A valve that performs outside of its normal performance specifications can prevent the system within which it is installed from achieving its required function. This can result in scrap being produced by the manufacturing equipment, damage to the equipment, and production downtime. Production downtime reduces efficiency in the manufacturing process and has direct bottom line costs associated with it. A valve fault (i.e., a condition outside of the valve's normal performance specifications) can result from problems with any number of internal operational components. Components may experience wear or the components may suffer from contamination that becomes introduced during the valve's service life. Eventually, the performance of the valve may degrade to such a degree that it is no longer capable of fulfilling its intended task. However, prior to that point, the valve typically displays diminished performance. Such diminished performance may manifest itself as slower response times or as erratic response. This diminished performance often goes unnoticed during the ongoing manufacturing operations because the valve otherwise continues to operate within acceptable limits and the manufacturing output does not initially suffer.

Functioning of the control valve is usually monitored indirectly based on the influence on the pneumatically-controlled parts of a manufacturing machine and the corresponding machine control system which are monitored according to the production output. As long as the manufactured part is acceptable, then only routine maintenance would be performed on the system components like the control valve. When the production process fails or the produced parts exhibit detectable flaws, the main controller which controls operation of the production process can shut down the system. The production user then troubleshoots the problem based on analysis of the production issue. If the problem can be isolated to the control valve then it can be repaired or replaced.

Besides indirectly monitoring control valve performance, conventional systems often perform direct monitoring of the output of a control valve. Typically, this is accomplished by coupling sensor switches to logic controllers for monitoring valve actuation and deactuation in order to identify if the response was outside of a pre-established parameter. The pre-established parameter is typically based on functional performance of the controlled machine.

Most conventional valve monitoring systems, however, are incapable of addressing the issue of gradually diminished performance nor can they accurately track degradation in a manner to provide any form of prediction of expected remaining serviceable life. International application WO 2006/056214 measures changes in various internal parameters of a control valve and the other pneumatic system components for comparison to pre-established limits. Likewise, European patent 1365159 uses valve monitoring based on stored setpoint values for defining an acceptable switching delay. Due to the foregoing limitations of the prior art, impending faults have not been accurately predicted.

SUMMARY OF THE INVENTION

The present invention monitors predetermined aspects of a valve's performance throughout its service life. When the valve begins to exhibit diminished performance, the monitoring device generates an indication signal to warn manufacturing personnel that the valve is moving toward a condition in which it will no longer function properly. This warning will allow the user to perform preventative maintenance so that production interruptions or loses can be avoided.

In one aspect of the invention, a fluid control valve system comprises a valve body having an elongated bore in communication with an inlet port and an outlet port. A valve element is movable within the bore between first and second positions. A valve sensor is mounted in relation to the valve body for generating a sensor signal indicative of an instantaneous parameter of the valve that changes between the first and second positions. A pilot is mounted to the valve body adapted to receive a pilot command signal and to move the valve element in response to the pilot command signal. A logic unit receives the sensor signal and the pilot command signal, wherein a predetermined change in the pilot command signal causes the logic unit to determine a cycle parameter responsive to a time period between two predetermined events. At least the beginning or end of the time period corresponds to a predetermined value of the sensor signal. The individual determinations of the cycle parameter are accumulated to obtain an expected cycle parameter. The logic unit generates an indication signal when the cycle parameter exhibits a predetermined variance from the expected cycle parameter.

DETAILED DESCRIPTION OF PREFERRED EMBODIMENTS

Figure 1:
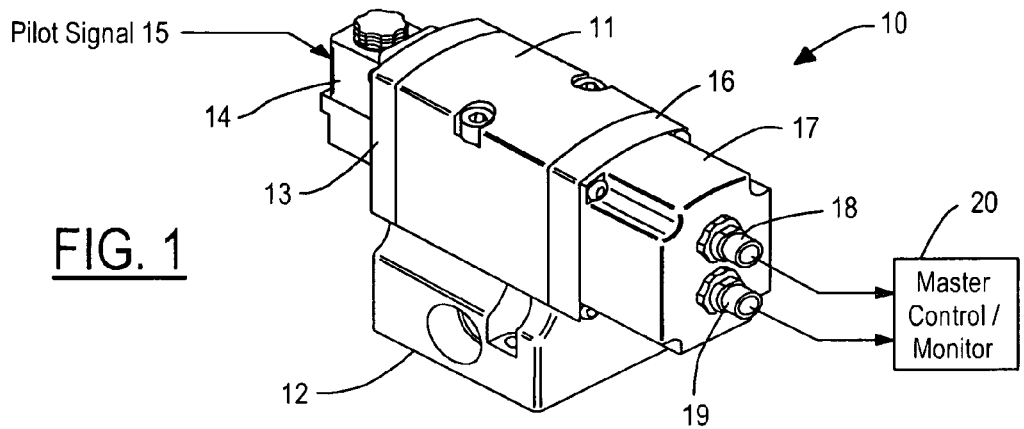
FIG. 1 is an isometric view of one embodiment of a valve unit of the present invention.

Referring now to FIG. 1, a valve system 10 includes a valve body 11 mounted to a base 12. Valve body 11 includes conventional valve internal parts for supplying fluid between various ports in base 12. A cover plate 13 mounts a pilot valve 14 to valve body 11. A pilot command signal 15 coupled to pilot valve 14 may be an electrical signal when the pilot valve 14 is an electrical solenoid-operated valve or may be a pneumatic signal when pilot valve 14 is pneumatically controlled. An end cap 16 is provided for mounting a housing 17 to valve body 11. Housing 17 includes the monitoring electronics of the present invention in the form of a logic unit and has end connectors 18 and 19 for electrically connecting the electronics to a master control/monitor 20.

Valve body 11, base 12, and pilot valve 14 may be any type of conventional fluid control valves employing one or more moving valve elements. Single valves, double valves, two-position valves, three-position valves, or any other valves with moving valve elements can be monitored using the present invention. An example of a valve having a single moveable valve element with two positions will be described herein. However, any valves such as a double valve having more than one moveable valve element can be monitored by duplicating the sensing and monitoring portions of the present invention to detect changes and the response of each separate valve element. Alternatively, a valve with a single valve element movable to three positions (i.e., for separately coupling an inlet to either one of two different outlets) can separately monitor cycling of the valve between a center deactuated position and oppositely directed actuated positions for the different outlets, respectively.

Figure 2:
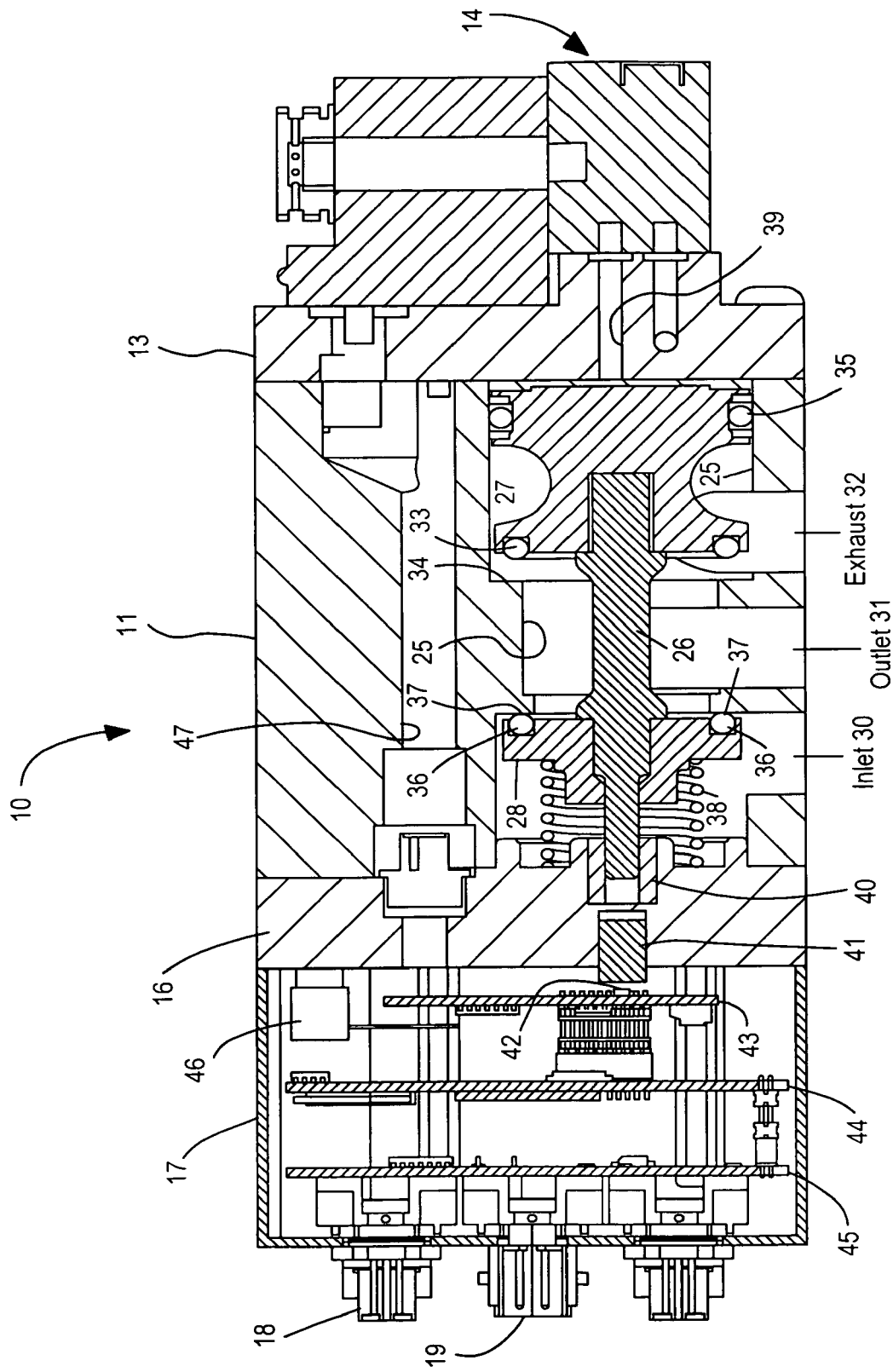
FIG. 2 is a cross section of another embodiment of the valve unit in a deactuated position.

Referring to FIG. 2, exemplary control valve 10 is shown in cross section. An elongated bore 25 extends across valve body 11 to receive a valve element 26 longitudinally moveable within bore 25 between a deactuated position shown in FIG. 2 and an actuated position shown in FIG. 3. Bore 25 creates various chambers for receiving different sections of valve element 26. Respective chambers in valve element 26 receive a piston poppet 27 at one end and an inlet poppet 28 at the other end. Bore 25 further communicates with an inlet port 30, an outlet port 31, and an exhaust port 32. Piston poppet 27 includes a seal 33 for engaging with a valve seat 34 when in the actuated position. In the deactuated position shown in FIG. 2, seal 33 is spaced away from seat 34 so that outlet port 31 is coupled with exhaust port 32. A radial seal 35 is also provided in piston poppet 27 for engaging bore 25 to maintain isolation between pilot pressure and valve ports 30-32.

Inlet poppet 28 includes a seal 36 for engaging valve seat 37 to selectably seal the inlet chamber from the outlet chamber. Thus, in the absence of pilot pressure against piston poppet 27, a spring 38 urges seal 36 against valve seat 37 so that inlet port 30 and outlet port 31 are isolated when the valve element 26 is in the deactuated position shown in FIG. 2. Outlet port 31 is thus coupled to exhaust port 32 when in the deactuated position and is coupled to inlet port 30 when in the actuated position. A pilot passage 39 through cover plate 13 delivers pilot pressure from pilot valve 14 to work against spring 38 when it is desired to place valve element 26 in the actuated position. As long as proper inlet and pilot pressures and a proper pilot control signal are present, valve element 26 moves quickly between the actuated and deactuated positions and cannot remain at any intermediate position unless due to a fault.

The present invention monitors response of valve element 26 during its operating cycles in order to detect changes in movement indicative of degraded performance and an increased likelihood of valve performance eventually falling outside of specifications. Control valve 10 includes additional elements associated with electronically monitoring the valve performance. One end of valve element 26 is received in a bushing 40 mounted in end cap 16. In close proximity, a magnet 41 is mounted in end cap 16 such that a magnetic field generated by magnet 41 is altered by the movement of valve element 26 which is magnetically permeable. Consequently, a Hall Effect Sensor 42 can be used to determine the instantaneous position of valve element 26 by monitoring the changing magnetic field generated by magnet 41. Hall Effect Sensor 42 is mounted on a first printed circuit board mounted in housing 17. Additional printed circuit boards 44 and 45 contain additional electrical components of a logic unit within housing 17.

It will be apparent to those skilled in the art that other methods of sensing valve element position can be employed. Instead of the stationary magnet 41, a magnet that moves with valve element 26 can be employed. For example, a portion of valve element 26 itself can be comprised of a permanent magnet and element 41 in FIGS. 2 and 3 could be a magnetic coupler (i.e., not permanently magnetized) to transmit the changing magnetic field from valve element 26 to Hall Effect sensor 42.

Besides position sensing, any sensor that generates a sensor signal indicative of an instantaneous parameter of the valve that changes between the deactuated and actuated positions can be employed. The invention depends only upon the ability to determine an elapsed amount of time between different values of the sensor signal when the valve changes between its deactuated and actuated positions. For example, the time evolution of the changing outlet pressure during a valve actuation or deactuation can be used. The changing outlet pressure can also be used to verify that input and output parameters are not adversely affecting the sensor signals and response time.

Figure 3:
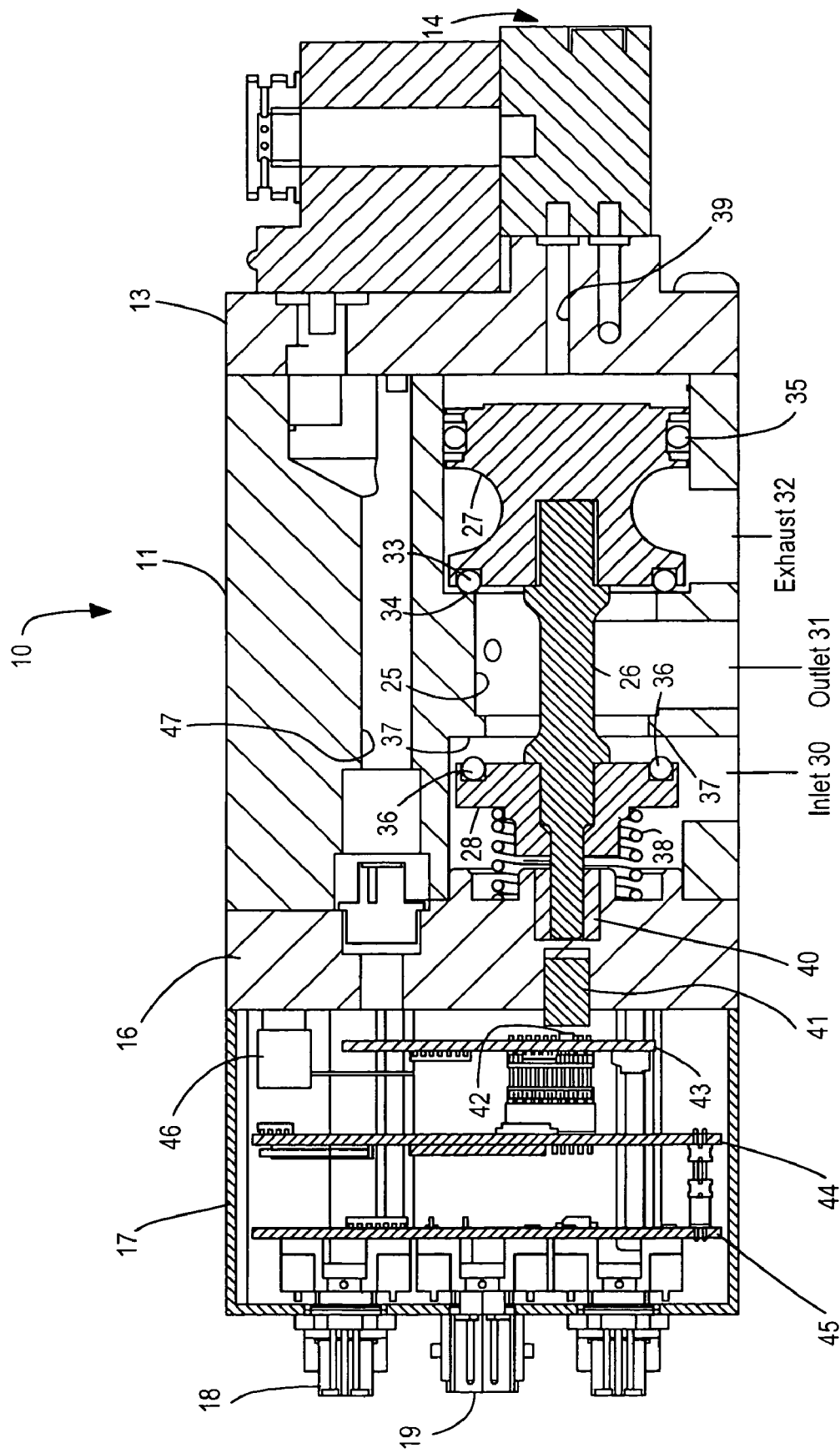
FIG. 3 is a cross section of the valve unit of FIG. 2 in an actuated position.

The control valve of the present invention includes additional sensors that may be used in detecting the timed events associated with movement of valve element 26 or to determine other conditions within the valve or external influences from outside the control valve (all referred to herein as "general conditions"). Thus, FIGS. 2 and 3 show a plurality of pressure sensors 46, including at least two pressure sensors 46 for measuring the inlet and outlet pressures, respectively. Passages (not shown) through end cap 16 and valve body 11 couple pressure sensors 46 with respective inlet and outlet chambers. The measured pressures may be processed by the logic unit to derive values for steady state inlet and outlet pressures for the activated and deactivated valve states as well as detecting a maximum instantaneous pressure drop in the inlet during a valve actuation. One or more temperature sensors (not shown) may also be provided in order to monitor temperature of valve 10 and its environment. The electrical signal provided to pilot valve 14 is also coupled to the logic unit as a general condition through a wiring cavity 47 extending between cover plate 13 and end cap 16.

Figure 4:
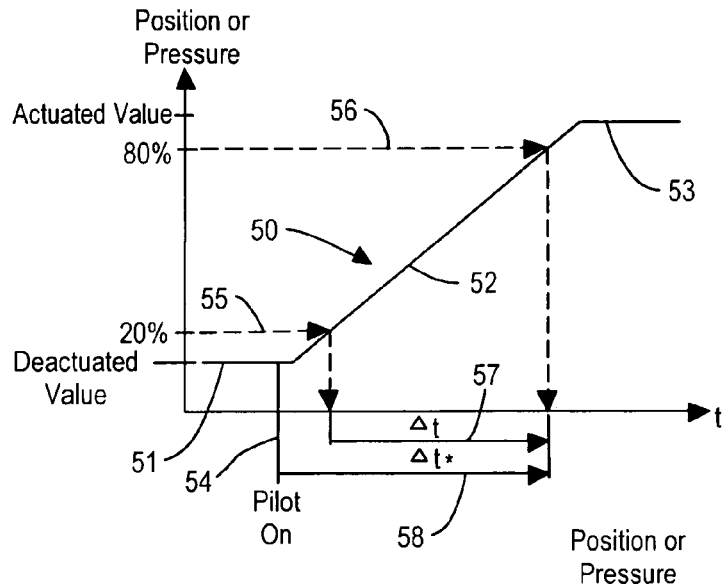
FIG. 4 is a graph showing various embodiments for determining a cycle time parameter during a valve actuation.

FIG. 4 shows exemplary ways of defining timed events corresponding to an instantaneous parameter of the valve that changes between the deactuated and actuated positions. FIG. 4 is a graph showing a plot line 50 representing a sensor signal corresponding to 1) the linear position of the valve element between the actuated and deactuated positions, or 2) the outlet pressure, to give just two examples. The control valve is initially deactuated so that the instantaneous parameter being monitored has an initial deactuated value, as shown along segment 51. Nominally, the deactuated value corresponds to a zero position (with the exhaust poppet open and the inlet poppet fully closed), or an outlet pressure of substantially zero (i.e., ambient atmospheric pressure). A pilot command signal ("pilot on") occurs at 54 causing the position or pressure to rise (after a short delay time) along a segment 52 until reaching a final actuated value at segment 53. Timed events between the beginning and the end of segment 52 can be used to determine a cycle parameter corresponding to the valve actuation. However, it is more preferable to avoid complicating factors such as accelerations and bounce at the beginning and end of valve element movement by using just a portion of segment 52. Therefore, an event 55 is defined at a 20% level between the deactuated value and the actuated value to indicate the first timed event. An 80% value defines an event 56 for the second sensor signal defining the time for the second event. The resulting cycle parameter 57 corresponds to a measured time duration Δt. An alternative cycle parameter 58 may be defined using a first event corresponding to the time of the pilot command signal 54 (sensed by the logic unit via direct wiring to the pilot or by a pilot pressure sensor) with a corresponding cycle parameter time Δt* ending at the time corresponding to the 80% sensor signal.

Figure 5:
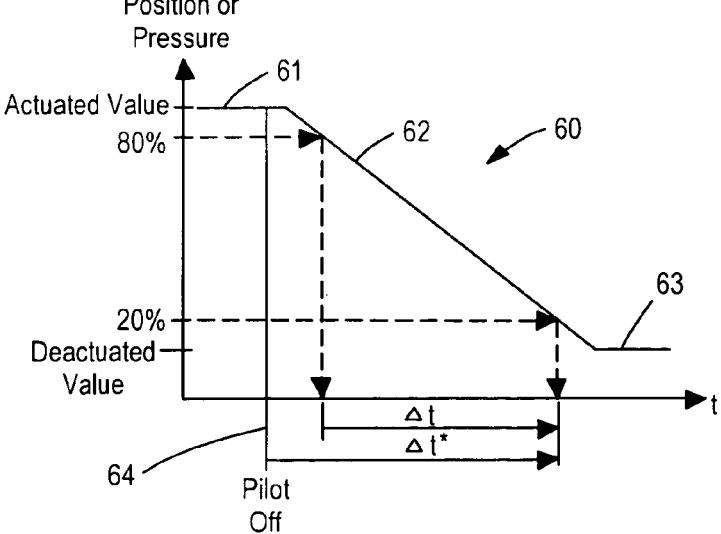
FIG. 5 is a graph showing various embodiments for determining a cycle time parameter during a valve deactuation.

FIG. 5 is a similar diagram showing determination of a cycle parameter during a deactuation of the control valve. A plot line 60 includes a segment 61 corresponding to the steady state actuated value of the chosen parameter while the valve remains in its actuated state. A "pilot off" event 64 occurs when the pilot command signal is removed. After a short reaction time, the chosen parameter then reduces along segment 62 until reaching a deactuated steady-state value at segment 63. A deactuation cycle parameter is determined between a pair of events defined along segment 62. The cycle parameter may begin at an 80% level of the instantaneous parameter or may begin at the turning off of the pilot command signal, for example. The measured time for the cycle parameter may end at the 20% level of the chosen parameter or at a different level of the parameter. The 20% and 80% levels of the chosen parameter are provided as examples only. Any pair of points along segments 52 and 62 that can be consistently and accurately determined may be employed for determining the actuation and deactuation cycle parameters. The present invention achieves the ability to forecast when a degradation of valve performance may occur by monitoring changes in the cycle parameter against long term averages, as will be explained in more detail below.

Figure 6:
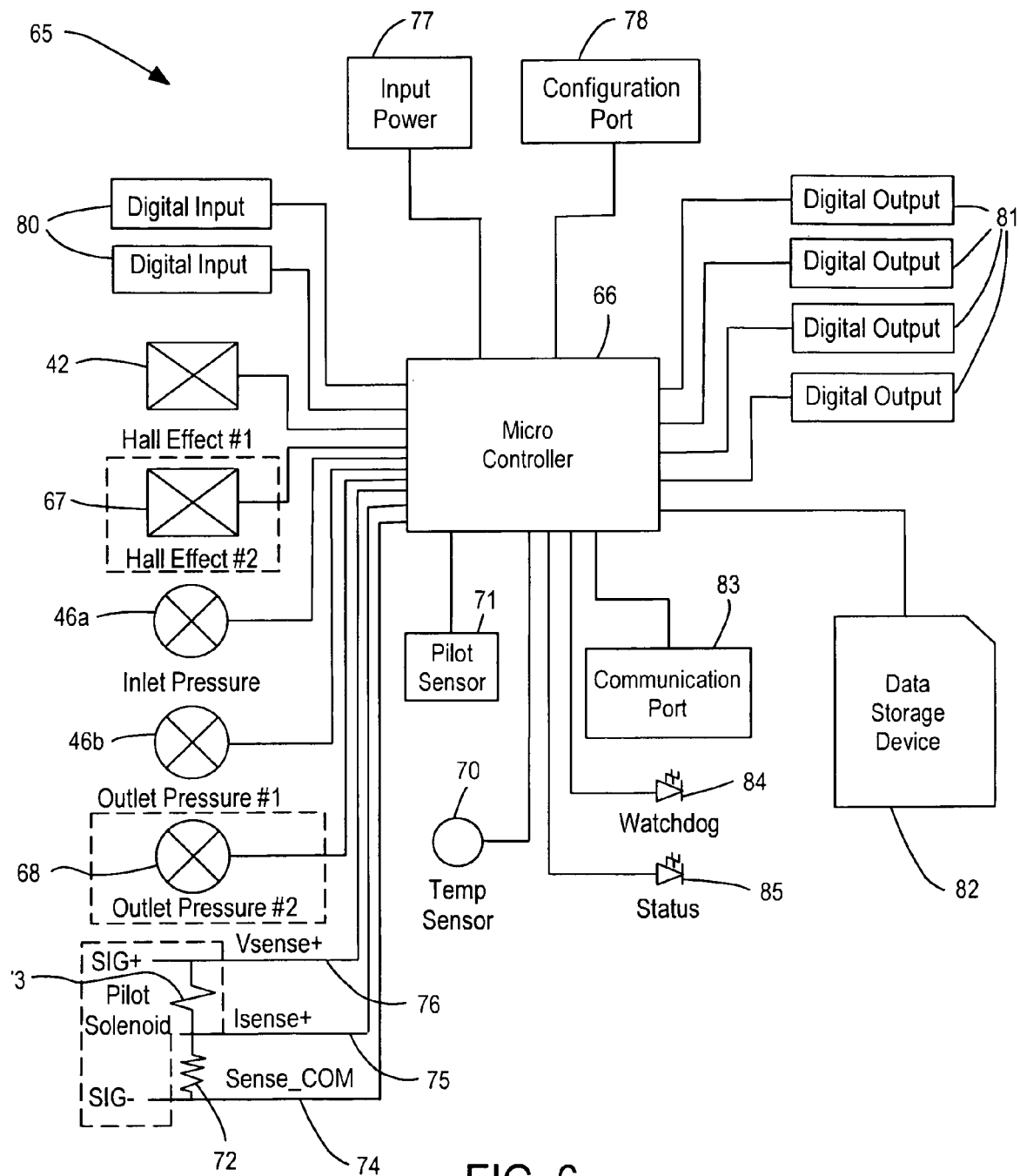
FIG. 6 is a block diagram of one embodiment of a logic unit.

A logic unit 65 of the present invention is shown in greater detail in FIG. 6. A microcontroller 66 may be comprised of any suitable microprocessor such as the LPC2368 microcontroller available from NXP Semiconductors, for example. Microcontroller 66 is connected to Hall Effect Sensor 42. In the event that a control valve having more than one moveable valve element being monitored, a second Hall Effect Sensor 67 may be provided either internally or externally of the packaged electronics within the electronic module housing.

Inlet pressure sensor 46A and outlet pressure sensor 46B are coupled to microcontroller 66. For monitoring a 3-position valve having a second outlet or a valve that utilizes two independent movable valve elements and a second outlet, an outlet pressure sensor 68 may also be provided. A temperature sensor 70 integral with the valve is also connected to microcontroller 66. In the event that the pilot valve is pneumatically actuated, a pilot pressure sensor 71 may be provided for generating a pilot command signal to allow logic unit 65 to detect the onset of each actuation and deactuation during a valve cycle.

When the pilot valve is electrically controlled, a sense resistor 72 may be connected in series with a pilot solenoid 73 thereby providing a common sense line 74, a current sense line 75, and a voltage sense line 76 all coupled to microcontroller 66.

An input power conditioning block 77 provides regulated power to microcontroller 66. A configuration port 78 is coupled to microcontroller 66 for allowing the user to access and configure various setup and configuration parameters. A plurality of digital inputs 80 can be used to signal the valve to perform some action or logic operation, such as initiating a manual reset of the statistical baseline (described below).

A plurality of digital outputs 81 are provided by microcontroller 66 that may be used to indicate valve status. For example, digital outputs 81 may comprise binary flags for indicating when valve performance is normal, when a parameter out of range, when some aspect of valve performance has changed, and when a logical comparison of inlet pressure to outlet pressure meets a predetermined condition. For example, a respective flag can be set when outlet pressure is greater than some adjustable percentage of inlet pressure as an indication that the downstream device being controlled has become fully actuated and is ready-to-run (i.e., the work being done by the outlet has been achieved). A PLC or other process controller can use this information to move up the beginning of the next machine cycle and thereby speed up the process being performed.

A data storage device 82 (such as a removable SD card or fixed memory) is coupled to microcontroller 66 and may be used to store logged data, statistical performance data, fault data, and cycle-to-cycle performance data. A communication port 83 is coupled to microcontroller 66, and may be comprised of an Ethernet port or other serial or parallel type network communication function for allowing interaction with the logic unit by other electronic devices such as a PLC or a PC.

A watchdog LED 84 is connected to microcontroller 66 and is activated to provide a visual indication that logic unit 65 is functional (e.g., to be used as a troubleshooting tool). A status LED 85 is coupled to microcontroller 66 and may be used in order to generate any desired programmable indication during operation of the logic unit.

Typical system operation of the present invention for monitoring a control valve with one internal shifting valve element proceeds generally as follows. A pilot command signal is received to actuate the valve. The command signal may be either an electrical signal for operating a solenoid or a pilot pressure for a pneumatically-controlled pilot valve. The logic unit detects the pilot command signal and starts an actuation timer. A cycle count maintained in the logic unit is increased by one. The logic unit examines the pilot signal to verify that its voltage and current are within predefined limits determined by the design characteristics of the solenoid unit being used and previously loaded into the logic unit. The predefined limits can also be adjusted in the field (e.g., through the configuration port or the communication port, for example). Whenever the pilot command signal is not within the predefined limits, the logic unit logs a fault and provides an output signal to indicate the problem to an external device such as a PLC or other main controller.

The inlet pressure is also measured and recorded by the logic unit. A steady state value of the inlet pressure is accumulated (e.g., by taking a long term average) and may be compared to predefined limits for that variable. The instantaneous value throughout an activation cycle may also be compared to the steady state baseline inlet pressure accumulated by the logic unit over previous cycles. If instantaneous inlet pressure is not within a certain percentage of the baseline value, the logic unit provides a fault message or other indication such as an LED signal. Other general conditions may also be sensed and recorded before, during, and after each valve operating cycle, and fault messages generated when the general conditions fall outside their prescribed limits.

Actuation of the pilot applies pilot pressure to the piston of the valve element causing the valve element to shift from the deactuated position toward the actuated position. Movement of the stem portion of the valve element causes the magnetic field sensed at the Hall-effect sensor to change. The sensor signal is processed to determine the position of the valve element in real time. The instants of time indicated by the running actuation timer are recorded for predetermined positions along the path of the valve element (such as the positions 20% and 80% of the way between end positions). Based on the difference between the timed events, the time for performing the corresponding movements are determined. The logic unit compares the time values to baseline times as established by the logic unit for the specific valve using data recorded and statistically analyzed for previous cycles of operation. If the valve element's response times are not within the process control limits for the chosen cycle parameters (which have been either manually input or determined according to a baseline accumulated during previous cycles of operation), the logic unit logs a fault and provides a corresponding fault message or other indication to the external device. A similar process is performed during the deactuation cycle.

Figure 7:
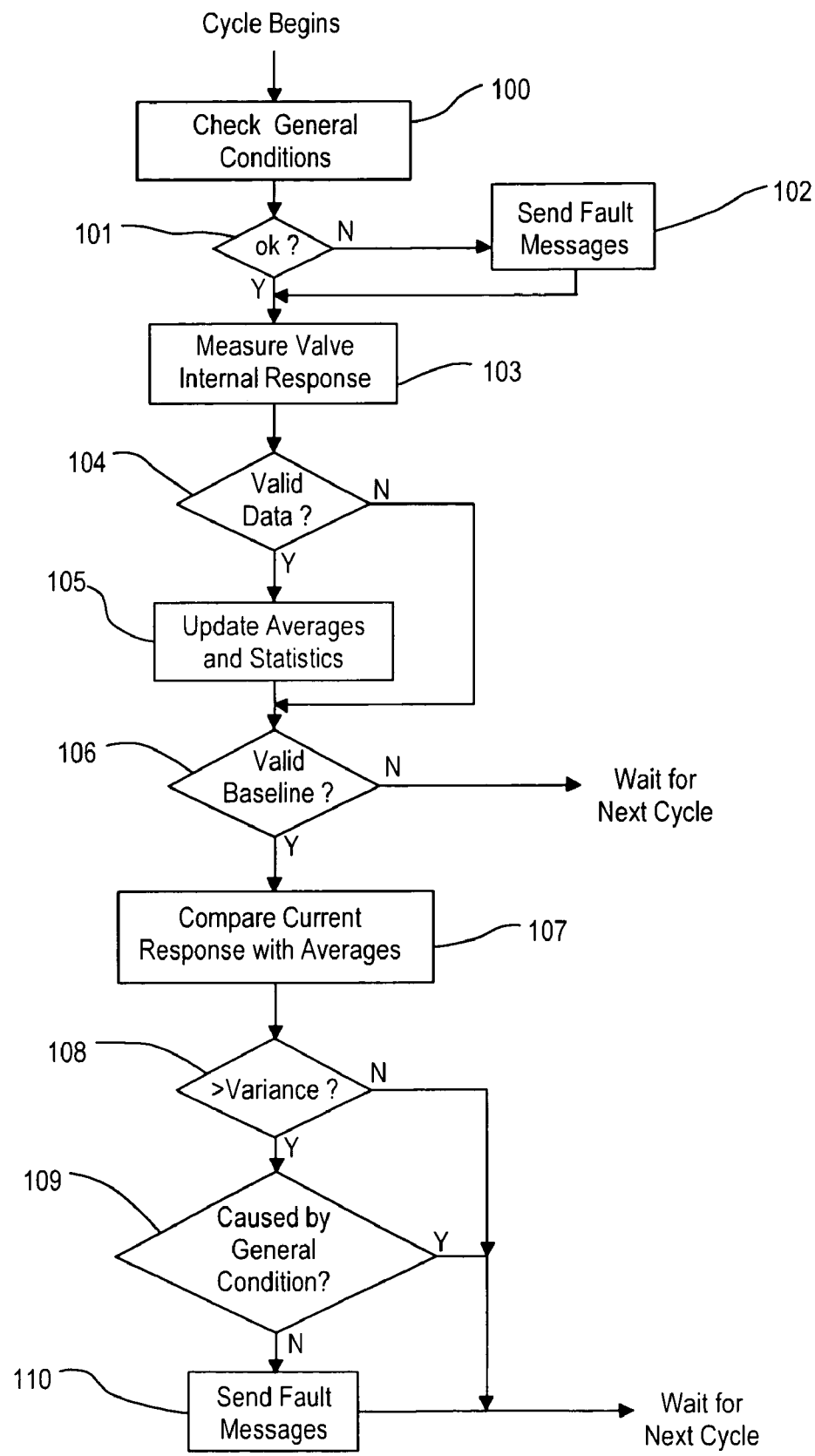
FIG. 7 is a flowchart of one preferred method of the invention.

A preferred method of the present invention will now be described in connection with the flowchart of FIG. 7. A new cycle begins when the logic unit detects the pilot has been turned on. In step 100, the logic unit checks various general conditions such as inlet pressure, voltage and current of the pilot signal, and valve temperature. The minimum position of the valve stem may also be measured as a general condition since a change in the minimum condition (i.e., the steady state position farthest from the Hall sensor and nominally the deactuated position) can be an indication of an accumulation of debris on the valve seat or other seal problems preventing complete deactuation of the valve. In addition, some general conditions may be monitored throughout the cycle, such as the inlet pressure so that a minimum instantaneous inlet pressure can be determined as an indication of possible problems in the inlet fluid supply, such as a faulty or clogged filter. All of the general conditions are compared to their target ranges (whether determined statistically from previous valve cycles or determined from hard limits supplied during configuration of the logic unit) in step 101. If any general conditions are not within their target ranges, then fault messages or other indications are sent in step 102. The valve internal response during the activation is measured in step 103. A check is made in step 104 to determine whether valid data is obtained with respect to the valve internal response. The validity of data depends upon whether the general conditions are such that nominal performance of the internal valve element would be expected. If conditions for obtaining valid data are not present, then the logic unit waits for the next cycle of the valve. However, if valid data is obtained, then the ongoing averages and statistical accumulation of data are updated in step 105.

A check is made in step 106 to determine whether a valid baseline has been accumulated (i.e., whether a sufficient number of cycles have been included in the accumulated averages). If not, then the logic unit waits for the next cycle to occur. Alternatively, the valid internal response data can be compared with extreme limits stored by the logic unit for defining borderline operation that may only be acceptable for limited periods of time. For example, a large time window in the range of 100 to 200 mS can be compared to the determined cycle times prior to accumulation of the baseline, with events falling outside the range being ignored for a limited time frame.

If a valid baseline has been accumulated, then the current valve response is compared with expected value(s) in step 107. In one embodiment (referred to herein as the "adaptive" mode), the expected value(s) are calculated as upper and lower control limits based on statistical process control (SPC) methodology using the cycle time parameter of successive cycles. In another embodiment (referred to herein as the monitoring mode), the current valve response (i.e., the current value of the cycle time parameter) is compared to an expected value determined as a long term average. A check is made in step 108 to determine whether a variance between the current response and the expected response is greater than a predetermined variance. In the monitoring mode, for example, it may have been determined from operating a valve over a baseline of 10,000 cycles that a cycle parameter defined as movement of the valve element between the 20% and 80% positions has an average of 20 milliseconds (ms). A predetermined variance may for example be comprised of a 10% increase so that if an instantaneous cycle parameter exceeds 22 ms then a predetermined variance exists for which a fault message or other indication signal should be generated.

If less than the predetermined variance exists, then the logic unit waits for the next cycle to begin. If the predetermined variance does exist, a check is made in step 109 to determine whether the variance may be caused by a general condition. If so, then the logic unit merely waits for the next cycle to begin. Otherwise, a fault message is generated in step 110 to indicate to a main controller, monitoring device, or human operator that the cycle time parameter exhibits a variance from the expected values (e.g., baseline averages or upper and lower control limits) indicating that degraded valve performance is present to such an extent that the logic unit forecasts that "out-of-spec" operation of the control valve may be imminent. In a preferred embodiment, the fault message may include a projected number of valve cycles remaining (or the time remaining based on the cycle rate of the valve) before a fault condition may occur.

Figure 8:
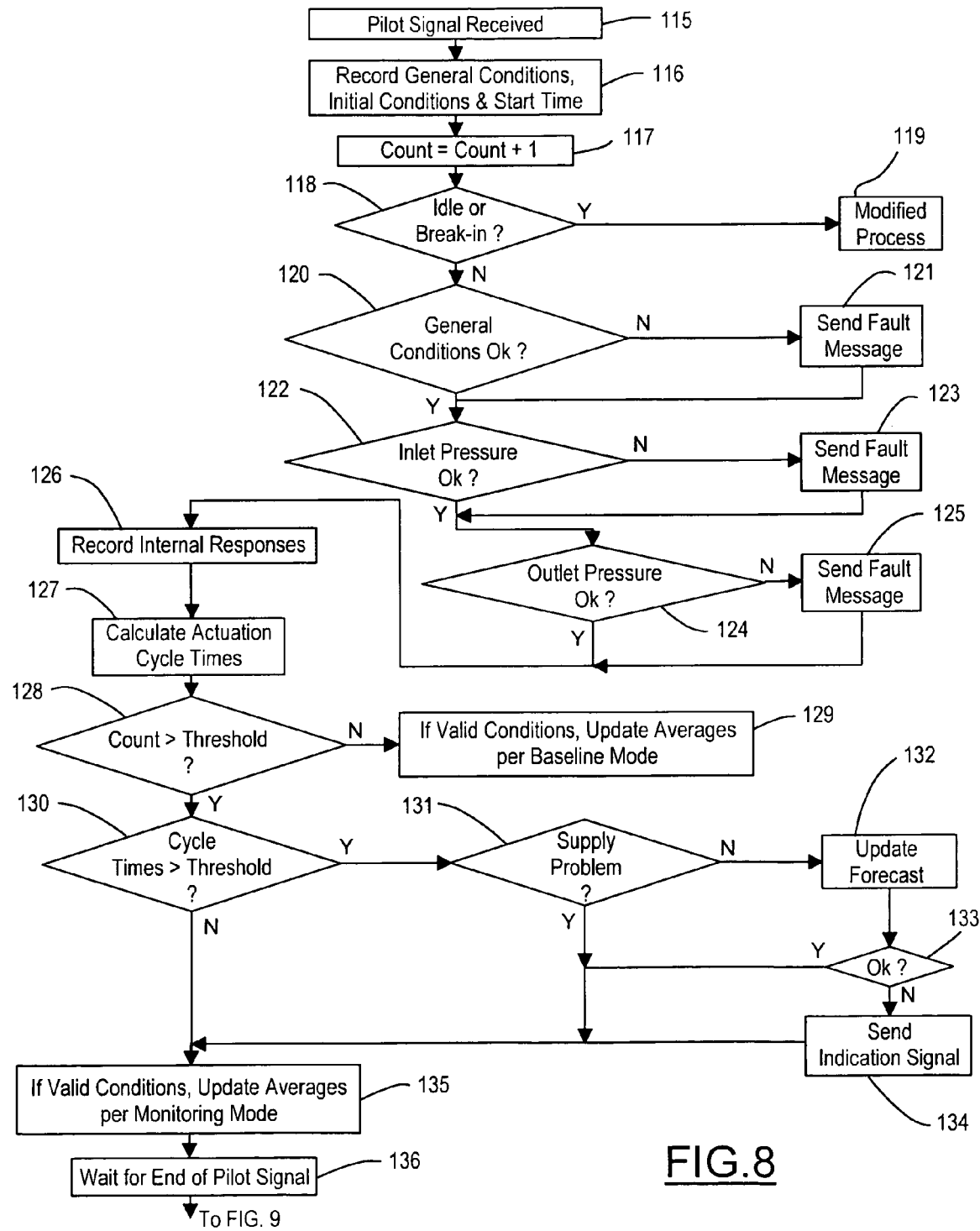
FIGS. 8 and 9 are a flowchart showing another preferred method of the invention in greater detail.

A more detailed process for the present invention is shown in FIG. 8. A pilot command signal is received in step 115. The general conditions, initial conditions, and a start time are recorded in step 116. A cycle count is incremented by one in step 117. A check is made in step 118 to determine whether the cycle count since initial installation of the control valve has a low value indicating that the control valve system is in a break-in period (i.e., a time during which the valve components are wearing in and adjusting to each other and have not yet reached an operating condition with consistent performance). Similarly, step 118 checks for an idle condition wherein a particular time has elapsed since the previous cycling of the valve. For example, when a manufacturing process is shut down over the weekend, the first several valve cycles on the next workday may experience transients in the valve operation itself or in the upstream and downstream components of the manufacturing system so that measured data is not reliable and should not be used in the accumulated ongoing averages. In the idle or break-in conditions, a modified process 119 is utilized. The modified process discounts certain changes in the measured values but otherwise can still monitor overall valve performance.

If not in the idle or break-in period, a check is made in step 120 to determine whether other general conditions are okay. If not, then a fault message is sent in step 121. Throughout the valve actuation cycle, the inlet pressure is checked in step 122, and if outside predefined limits, and then a fault message is generated in step 123. Similarly, outlet pressure is checked in step 124 throughout the valve cycle and a corresponding fault message is sent in step 125 when outlet pressure falls outside the predetermined limits.

The internal responses of the valve element (e.g., the time between events when the valve element is sensed at predetermined positions or the times when predetermined pressures are present in the outlet) are recorded in step 126. The actuation cycle times are calculated in step 127 in response to the recorded times for the valve element responses and/or the time of a change in the pilot command signal. The method of FIG. 8 operates in a baseline mode or a monitoring mode as follows. A check is made in step 128 to determine whether the cycle count is greater than a threshold wherein the threshold represents a number of cycles selected to represent a sufficiently long period of valve operation wherein a meaningful average can be obtained. Until reaching the threshold, averages are accumulated in the baseline mode but are not used in order to forecast remaining lifetime (i.e., the number of cycles until an out-of-spec valve condition). Thus, if the count is not greater than the threshold in step 128, then the averages are updated per the baseline mode in step 129, subject to general conditions being present indicating that valid data has been obtained.

If the count exceeds the threshold in step 128, then operation is performed in a monitoring mode beginning with step 130 wherein one or more cycle time parameters determined for the present cycle (or an average over a certain window of cycles) are compared with a cycle parameter threshold (e.g., a value proportional to the accumulated baseline average). As an alternative to or in addition to checking an average, a check can be made of the standard deviations of the valve performance parameters. Standard deviation trends will indicate if there is more variability in the valve's performance (sticking) as cycles accumulate.

If the cycle times are greater than the cycle parameter threshold indicating that valve element movement has slowed sufficiently to indicate a trend, then a check is made in step 131 to determine whether the increased time could be due to a problem in the supply of pressurized fluid to the inlet. If the supply conditions are within nominal limits, then a forecast for the number of cycles or time until potential fault of the valve is updated in step 132. For example, average cycle parameters over distinct groups of consecutive cycles may be calculated and retained in the logic unit so that any trend of increasing cycle time parameters can be observed. Cycle times (and/or standard deviations) of the respective groups can be processed (e.g., integrated) to determine the slope at which the average cycle time parameter is increasing. Based on the slope and current value, a projection of the number of remaining cycles until the average cycle time would reach an unacceptable length of time is estimated. The corresponding time or number of cycles until a fault condition may be compared to a predetermined number of cycles in step 133. If the projected number of remaining cycles is not less than the predetermined number, then an acceptable situation is detected. Otherwise, an indicating signal is sent in step 134 to indicate to the main controller and the human operator that an impending fault is forecasted. The indication may or may not include the number of remaining cycles or time until the fault is predicted to occur.

If the measured cycles times are not greater than the threshold in step 130 (i.e., the current cycle parameter does not exhibit the predetermined variance from the expected cycle parameter), or after detecting a supply problem in step 131, determining that the updated forecast is okay in step 133 or sending an indication signal in step 134, then running averages for the cycle parameter are updated in step 135 provided that the general and other conditions are such that the cycle parameter data is valid. The method for determining updated averages in step 135 can be equivalent to the method in step 129 of the baseline mode or can be modified to provide a different sensitivity to changes in the cycle parameters (e.g., reducing sensitivity of the averages to large changes in the current values while in the monitoring mode). Thereafter, the logic unit waits for the end of the pilot signal in step 136 as an indication of the beginning of a deactuation cycle.

Figure 10:
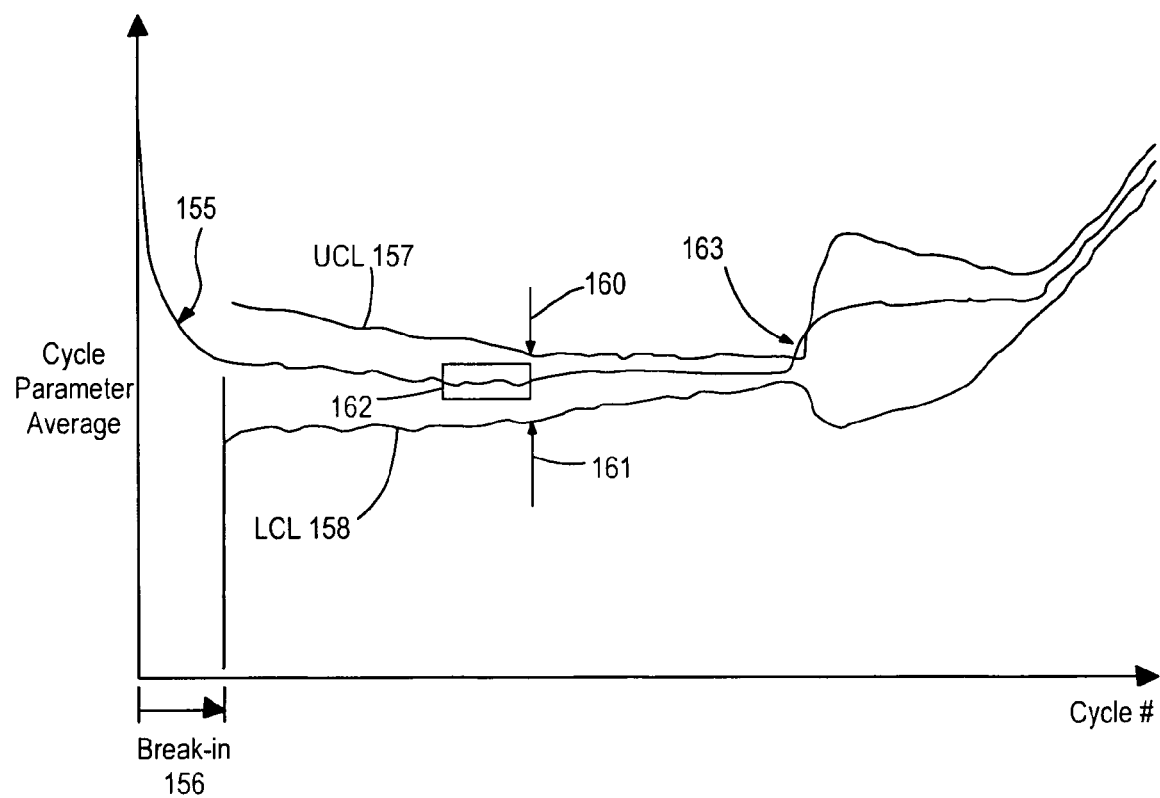
FIG. 10 is a plot showing the comparison of a cycle time parameter average with upper and lower control limits determined using statistical process control.

In addition to the baseline and monitoring modes, the present invention may also utilize an "adaptive" mode. In this mode, the logic unit detects a significant change occurring in a cycle parameter or general variable of the control valve. Based on previous samples of the cycle parameter or general variables, upper and lower control limits are calculated using statistical process control as shown in FIG. 10 wherein cycle parameter values are plotted as a line 155. Each data point in line 155 may preferably comprise an average cycle parameter value or a standard deviation determined over several cycles which are sampled periodically.

The adaptive mode may be inactive during an initial break-in period 156. Thereafter, an upper control limit (UCL) 157 and a lower control limit (LCL) 158 is dynamically determined throughout the life cycle of the control valve. For example, the UCL 157 and LCL 158 may be calculated at cycles designated 160 and 161, respectively, using cycle parameters occurring during a window 162. In one embodiment, a sliding window can be used for calculating the UCL and LCL at different times. The value of UCL 157 and LCL 158 can be determined in a conventional, well-known manner based on a statistical variance such as a six sigma ($\sigma$) variance. At an event 163, a sudden change in line 155 causes it to become greater than UCL 157, resulting in the current variance being greater than the predetermined variance so that a fault message is generated. After event 163, the UCL and LCL have a widening separation because of the significant change in the cycle time parameter.

Figure 9:
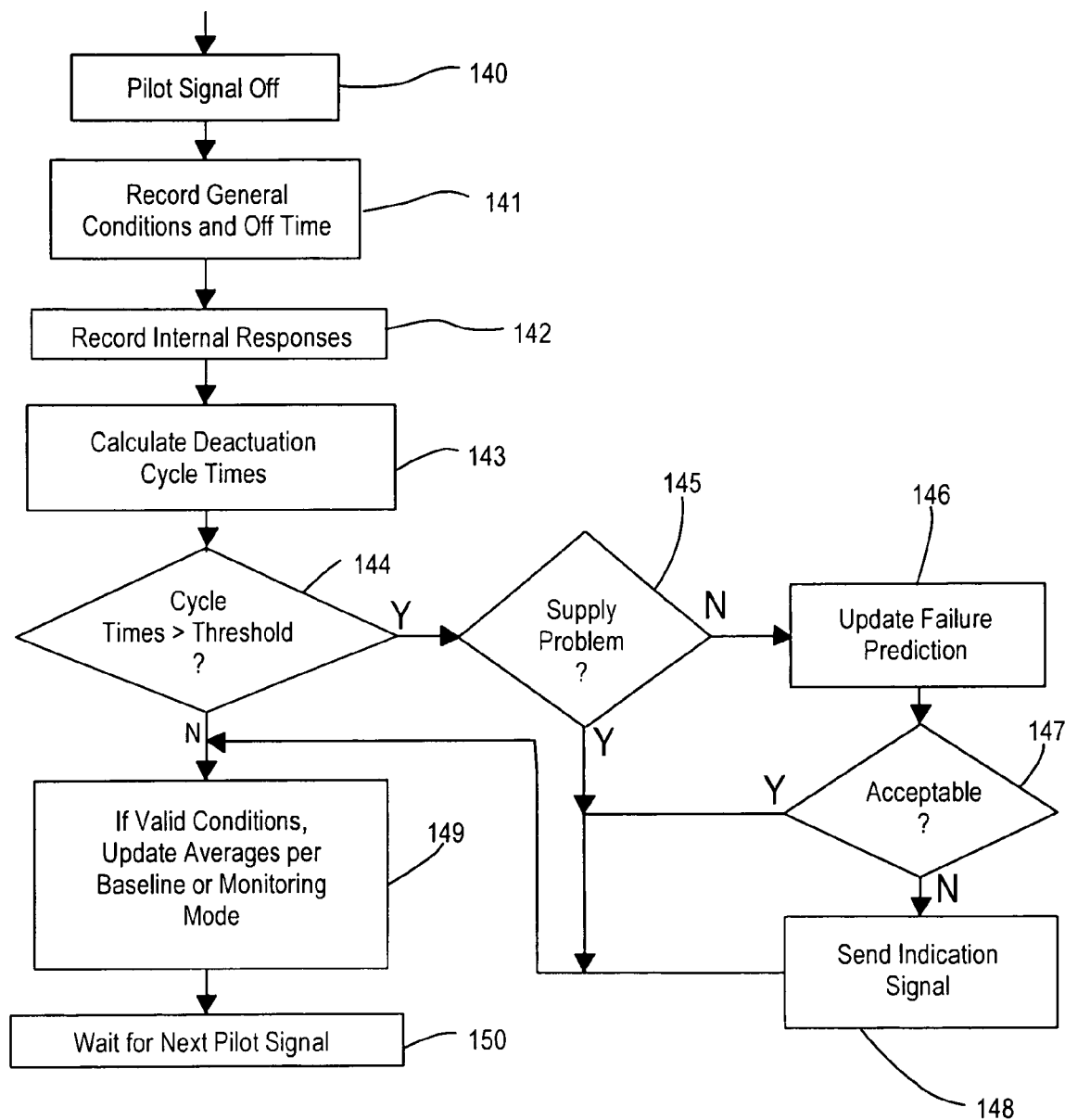

Handling of a deactuation cycle is shown according to the flowchart of FIG. 9. The pilot command signals turns off in step 140. General conditions and the off-time are recorded in step 141. The valve internal responses are recorded in step 142. In step 143, the deactuation cycle times are calculated. The parameter cycle times are compared to a threshold (corresponding to a percentage of the average, the UCL and LCL, or other prescribed limits) in step 144. A check is made in step 145 to determine whether a supply problem is causing a variance between the current deactuation cycle time and the threshold. If not, then the degradation prediction or forecast is updated in step 146. If the projected time to fault is acceptable in step 147 then no indication signal is sent. If unacceptable, then the indication signal is sent in step 148.

In step 149, the cycle parameter expected values (e.g., averages or UCL and LCL) are updated according to the baseline or monitoring mode of operation as long as valid conditions are present. Thereafter, the logic unit waits for the next pilot command signal in step 150.

What is claimed is:

1. A fluid control valve system comprising:
   a valve body having an elongated bore in communication with an inlet port and an outlet port;
   a valve element movable within the bore between first and second positions, wherein the outlet port is selectably coupled to the inlet port according to the position of the valve element;
   at least one valve sensor mounted in relation to the valve body for generating a sensor signal indicative of at least one instantaneous parameter of the valve that changes between the first and second positions;

a pilot mounted to the valve body adapted to receive a pilot command signal and to move the valve element in response to the pilot command signal; and a logic unit receiving the sensor signal and the pilot command signal, wherein a predetermined change in the pilot command signal causes the logic unit to determine a cycle parameter responsive to a time period between two predetermined events, wherein at least the beginning or end of the time period corresponds to a predetermined value of the sensor signal, and wherein the logic unit operates in a baseline mode, a monitoring mode, and an adaptive mode;

wherein the baseline mode comprises an initial predetermined number of cycles of the pilot command signal, and wherein individual determinations of the cycle parameter are accumulated to obtain an expected cycle parameter;

wherein the monitoring mode is utilized after completion of the baseline mode, and wherein the logic unit generates an indication signal when the cycle parameter during the monitoring mode exhibits a predetermined variance from the expected cycle parameter, wherein in the adaptive mode the expected cycle parameter is determined by statistically calculating an upper control limit and a lower control limit in response to individual determinations of the cycle parameter within a predetermined window, and wherein the predetermined variance is comprised of the cycle parameter being above the upper control limit or below the lower control limit.

2. The fluid control valve system of claim 1 wherein a parameter sensed by the at least one valve sensor comprises an instantaneous pressure at the outlet port, and wherein at least one of the predetermined events comprises the sensing of a predetermined pressure between an actuated pressure and a deactuated pressure.

3. The fluid control valve system of claim 2 wherein the cycle parameter is comprised of a measured time period in which the valve element moves between the first and second positions.

4. The fluid control valve system of claim 3 wherein the cycle parameter exhibits the predetermined variance from the expected cycle parameter when the measured time period is greater than an average measured time period.

5. The fluid control valve system of claim 3 wherein the cycle parameter exhibits the predetermined variance from the average cycle parameter when the measured time period is less than an average measured time period.

6. The fluid control valve system of claim 3 wherein the cycle parameter exhibits the predetermined variance from the expected cycle parameter when the measured time period is greater than or less than a standard deviation.

7. The fluid control valve system of claim 3 wherein the first and second positions are substantially located at deactuated and actuated positions of the valve element, respectively.

8. The fluid control valve system of claim 3 wherein the first position is spaced from a deactuated position of the valve element and wherein the second position is between the first position and an actuated position of the valve element.

9. The fluid control valve system of claim 8 wherein the first position is substantially located at about 20% of the distance from the deactuated position to the actuated position, and wherein the second position is substantially located at about 80% of the distance from the deactuated position to the actuated position.

10. The fluid control valve system of claim 1 wherein a parameter sensed by the at least one valve sensor comprises an instantaneous position of the valve element, and wherein at least one of the predetermined events comprises a predetermined movement of the valve element.

11. The fluid control valve system of claim 10 wherein the predetermined movement is comprised of the valve element moving to a predetermined position between the first and second positions.

12. The fluid control valve system of claim 10 wherein the cycle parameter is comprised of a measured time period from the predetermined change in the pilot command signal until the valve element moves to a predetermined position.

13. The fluid control valve system of claim 12 wherein the cycle parameter exhibits the predetermined variance from the expected cycle parameter when the measured time period is greater than an average measured time period.

14. The fluid control valve system of claim 12 wherein the cycle parameter exhibits the predetermined variance from the expected cycle parameter when the measured time period is less than an average measured time period.

15. The fluid control valve system of claim 12 wherein the cycle parameter exhibits the predetermined variance from the expected cycle parameter when the measured time period is greater than or less than a standard deviation.

16. The fluid control valve system of claim 1 wherein the at least one valve sensor comprises a pressure sensor coupled to the outlet port for generating an outlet pressure signal in response to an outlet pressure in the outlet port, wherein the cycle parameter is comprised of a measured time period in which the outlet pressure moves between a first predetermined pressure and a second predetermined pressure.

17. The fluid control valve system of claim 16 wherein the cycle parameter exhibits the predetermined variance from the expected cycle parameter when the measured time period is greater than an average measured time period.

18. The fluid control valve system of claim 1 further comprising a plurality of general sensors generating a set of signals representing external general conditions of the valve system, wherein the set of signals is coupled to the logic unit, and wherein the logic unit determines whether the cycle parameter exhibits the predetermined variance from the expected cycle parameter because of a discrepancy in the set of signals.

19. The fluid control valve system of claim 18 wherein the discrepancy is determined in response to a general condition falling outside a predetermined range.

20. The fluid control valve system of claim 18 wherein the set of signals are accumulated during the baseline mode to obtain an average general condition, and wherein the discrepancy is determined in the monitoring mode in response to a comparison of a sensor signal with the average general condition.

21. The fluid control valve system of claim 18 wherein the plurality of general sensors include pressure sensors sensing a pressure at the inlet port and a pressure at the outlet port.

22. The fluid control valve system of claim 18 wherein the plurality of general sensors include a temperature sensor sensing an ambient temperature.

23. The fluid control system of claim 18 wherein the pilot is a solenoid valve, and wherein the plurality of general sensors include a voltage sensor sensing a voltage magnitude of the pilot command signal received by the solenoid valve.

24. The fluid control valve system of claim 18 wherein the pilot is a solenoid valve, and wherein the plurality of general sensors include a current sensor sensing a current magnitude received by the solenoid valve.

25. The fluid control valve system of claim 1 wherein the at least one valve sensor comprises a Hall Effect sensor and a magnet, wherein the magnet is mounted such that it generates a magnetic field that is penetrated by a varying amount by the valve element as it moves between the first and second positions, wherein the valve element is magnetically permeable, and wherein the Hall Effect sensor is mounted to sense the resulting variations in the magnetic field.

26. The fluid control valve system of claim 1 wherein the pilot is a solenoid valve, and wherein the pilot command signal is an electrical signal.

27. The fluid control valve system of claim 1 wherein the pilot is a pneumatic valve and wherein the pilot command signal is a pressure signal.

28. The fluid control valve of claim 1 wherein the at least one valve sensor is axially aligned with a longitudinal axis of the valve element.

29. The fluid control valve system of claim 28 wherein the at least one valve sensor comprises a Hall Effect sensor and a magnet, wherein the magnet is mounted such that it generates a magnetic field that is penetrated by a varying amount by the valve element as it moves between the first and second positions, wherein the valve element is magnetically permeable, and wherein the Hall Effect sensor is mounted to sense the resulting variations in the magnetic field.

30. The fluid control valve system as recited in claim 29 wherein the magnet is located between the Hall Effect sensor and the valve element.

31. A method of monitoring operation of a fluid control valve system, wherein the control valve system includes a valve body having an elongated bore in communication with an inlet port and an outlet port, wherein the control valve system includes a valve element movable within the bore between first and second positions, wherein the outlet port is selectably coupled to the inlet port according to the position of the valve element, wherein the control valve system includes a position sensor mounted in relation to the valve body for generating a position signal indicative of an instantaneous position of the valve element at and between the first and second positions, wherein the control valve system includes a pilot mounted to the valve body adapted to receive a pilot command signal and to move the valve element in response to the pilot command signal, the method comprising the steps of:
sensing an actuation of the control valve system in response to the pilot command signal and performing the following steps in response to the actuation;
incrementing a cycle count;
measuring a cycle time parameter associated with movement of the valve element between the first position and the second position;
selecting a baseline mode, a monitoring mode or an adaptive mode in response to the cycle count;
if in the baseline mode then updating an expected cycle time parameter; and
if in the monitoring mode then performing a comparison in response to the cycle time parameter and the expected cycle time parameter, and generating a first indication signal in response to the comparison showing a first predetermined variance.

32. The method of claim 31 wherein the cycle parameter is comprised of a measured time period in which the valve element moves from the first position to the second position.

33. The method of claim 32 wherein the cycle parameter exhibits the predetermined variance from the expected cycle parameter when the measured time period is greater than an average measured time period.

34. The method of claim 32 wherein the cycle parameter exhibits the predetermined variance from the expected cycle parameter when the measured time period is greater than or less than a standard deviation.

35. The method of claim 32 wherein the first and second positions are substantially located at a deactuated position and an actuated position of the valve element, respectively, and wherein the cycle time parameter corresponds to a deactuation time for the control valve system.

36. The method of claim 32 wherein the first position is spaced from a deactuated position of the valve element and wherein the second position is between the first position and an actuated position of the valve element.

37. The method of claim 36 wherein the first position is substantially located at about 20% of the distance from the deactuated position to the actuated position, and wherein the second position is substantially located at abut 80% of the distance from the deactuated position to the actuated position.

38. The method of claim 31 wherein the cycle time parameter is comprised of a measured time period from the predetermined change in the pilot command signal until the valve element moves to a predetermined position.

39. The method of claim 38 wherein the cycle parameter exhibits the predetermined variance from the expected cycle parameter when the measured time period is greater than an average measured time period.

40. The method of claim 38 wherein the cycle parameter exhibits the predetermined variance from the expected cycle parameter when the measured time period is greater than or less than a standard deviation.

41. The method of claim 31 further comprising the step of sensing an outlet pressure at the outlet port, wherein the cycle time parameter is comprised of a measured time period in which the outlet pressure moves between a first predetermined pressure and a second predetermined pressure.

42. The method of claim 41 wherein the cycle parameter exhibits the predetermined variance from the expected cycle parameter when the measured time period is greater than an average measured time period.

43. The method of claim 41 wherein the cycle parameter exhibits the predetermined variance from the expected cycle parameter when the measured time period is greater than or less than a standard deviation.

44. The method of claim 31 further comprising the step of statistically calculating an upper control limit and a lower control limit in response to the cycle time parameter over window including a plurality of cycles.

45. The method of claim 31 further comprising the steps of:
sensing a plurality of external general conditions of the valve system; and
determining whether the cycle time parameter exhibits the predetermined variance from the expected cycle time parameter because of a discrepancy in the external general conditions.

46. The method of claim 45 wherein the discrepancy is determined in response to an external general condition falling outside a predetermined range.

47. The method of claim 45 wherein the sensor signals are accumulated to obtain an average general condition, and wherein the discrepancy is determined in response to a comparison of an external general condition with the average general condition.

48. The method of claim 45 wherein the plurality of external general conditions include an inlet pressure at the inlet port and an outlet pressure at the outlet port.

49. The method of claim 45 wherein the plurality of external general conditions include an ambient temperature.

50. The method of claim 31 where if in the adaptive mode, then the method includes the step of performing a comparison in response to the cycle time parameter and an expected statistically calculated value range having an upper control limit and a lower control limit, and generating a second indication signal in response to the comparison showing the cycle time parameter being above the upper control limit or below the lower control limit.

* * * * *